United States Patent [19]

Soffer et al.

[11] Patent Number: 4,934,782
[45] Date of Patent: Jun. 19, 1990

[54] OPTICAL THRESHOLDING APPARATUS AND METHOD

[75] Inventors: Bernard H. Soffer, Pacific Palisades; Yuri Owechko, Newbury Park, both of Calif.

[73] Assignee: Hughes Aircraft Company, Los Angeles, Calif.

[21] Appl. No.: 282,889

[22] Filed: Dec. 9, 1988

Related U.S. Application Data

[63] Continuation of Ser. No. 145,334, Nov. 19, 1988, abandoned.

[51] Int. Cl.$^5$ .................. G06G 7/02; G02B 27/46; G02F 00/00
[52] U.S. Cl. ............................ 350/162.12; 350/342; 364/825
[58] Field of Search .............. 350/342, 162.12; 250/201; 364/825

[56] References Cited

U.S. PATENT DOCUMENTS

| | | | |
|---|---|---|---|
| 3,824,002 | 7/1974 | Beard | 350/160 LC |
| 4,351,589 | 9/1982 | Chavel et al. | 350/342 |
| 4,715,689 | 12/1987 | O'Meara et al. | 350/354 |
| 4,720,176 | 1/1988 | Klein et al. | 350/353 |
| 4,739,496 | 4/1988 | Marom et al. | 365/125 |
| 4,750,153 | 6/1988 | Owechko et al. | 365/125 |

OTHER PUBLICATIONS

M. A. Muriel and J. A. Martin-Pereda, "Digital Light Beam Deflector With Liquid Crystals," 1980 European Conference on Optical Systems and Applications (Utrecht) SPIE, vol. 236, pp. 386-388; and abstract "Analog Light Beam Deflector with Liquid Crystals", OSA vol. 70, No. 12, Oct. 1980.

D. J. Channin and D. E. Carlson, "Rapid Turn-Off in Triode Optical Gate Liquid Crystal Devices," Applied Physics Letters, vol. 28, No. 6, 15 Mar. 1976, pp. 300-302.

D. J. Channin, "Triode Optical Gate: A New Liquid Crystal Electro-Optic Device", Applied Physics Letters, vol. 26, no. 11, 1 Jun. '75 pp. 603-605.

A. E. Fray, "Large-Angle Beam Deflector Using Liquid Crystal," Elec. Letters, 7 Aug. '75, vol. 11, no. 16, p. 359.

G. L. Tangonan, "Variable-Grating-Mode Liquid Crystals for Fibre-Optic Applications," Electronics Letters, vol. 21, Aug. 1985, pp. 701,702.

(List continued on next page.)

Primary Examiner—Bruce Y. Arnold
Assistant Examiner—David R. Parsons
Attorney, Agent, or Firm—V. D. Duraiswamy; W. K. Denson-Low

[57] ABSTRACT

An apparatus and method for processing optical beams designed to adaptively spatially threshold or filter an intensity histogram spectrum for re-transformation to a two-dimensional thresholded optical output. Such apparatus and method is used in optical computing and logic processing to selectively pass only certain light intensities, thereby blocking undesirable background noise while passing the desired signals. An incoming histogram light beam, containing an optical position distribution corresponding to the intensity distribution of an original optical beam, is split into first and second beams. The first beam is directed at a light detector array which transforms the optical position intensities of the first bema into directly proportional electrical signals. These signals are sent to a microprocessor which analyzes this input, determines the intensity distribution, calculates the algebraic mean and variance, sets the intensity threshold level based on pre-set information, and sends an electronic voltage signal to an optical selective reflector. The optical reflector, preferably a CCD LCLV, is positioned to receive the second split beam, and is instructed by the electronic voltage signal to selectively reflect only certain optical intensities onto an inverse Fourier transform lens. This lens re-transforms the quasi-one-dimensional second split beam into the desired two-dimensional thresholded optical output.

21 Claims, 4 Drawing Sheets

OTHER PUBLICATIONS

Susumu Sato, "Liquid-Crystal Lens-Cells with Variable Focal Length", Japanese Journal of Applied Physics, vol. 18, no. 9, Sep. 1979, pp. 1679–1984.

B. H. Soffer, D. Boswell, A. M. Lackner, "Optical Computing with Variable Grating Mode Liquid Crystal Devices," SPIE vol. 232, 1980.

International Optical Computing Conference (1980), pp. 128 to 136.

M. A. Muriel et al, "Magneto-Optical Deflector with Nematic Liquid Crystals".

Proceedings of the Technical Program, Electro-Optics/Laser 80 Conference and Exposition, Boston MA, Nov. 19–21, 1980, pp. 199–201.

Yuichi Ninomiya, "Ultrahigh Resolving Electrooptic Prism Array Light-Deflectors", IEE Journal of Quantum Electronics, vol. QE-9, No. 8, Aug. 1973, pp. 791–795.

M. A. Muriel et al, Abstract titled "Analog Beam Deflector with Liquid Crystals", Journal of the Optical Society of America, Dec. 1980, vol. 70, No. 12, p. 1610.

M. A. Muriel et al, "Digital Light Beam Deflector with Liquid Crystals," Europhysics Conference Abstracts, 12, 1980 European Conference on Optical Systems & Applications, Utrecht (The Netherlands), 23-25 Sep. 1980, vol 41.

U. Efron et al, "Silicon Liquid Crystal Light Valves; Status and Issues", Optical Engineering, vol. 22, No. 6, Nov./Dec. 1983, pp. 682–686.

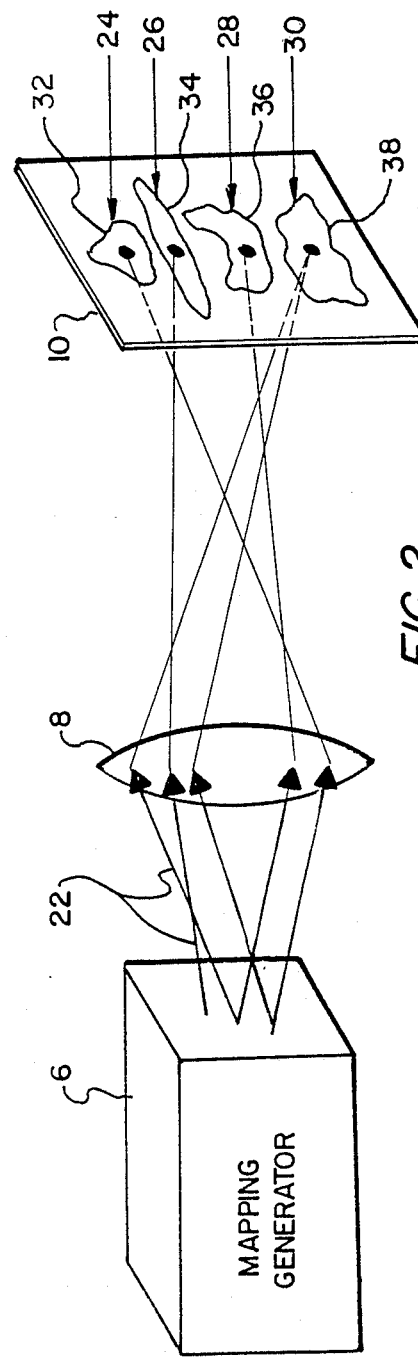
FIG.2.
(PRIOR ART)
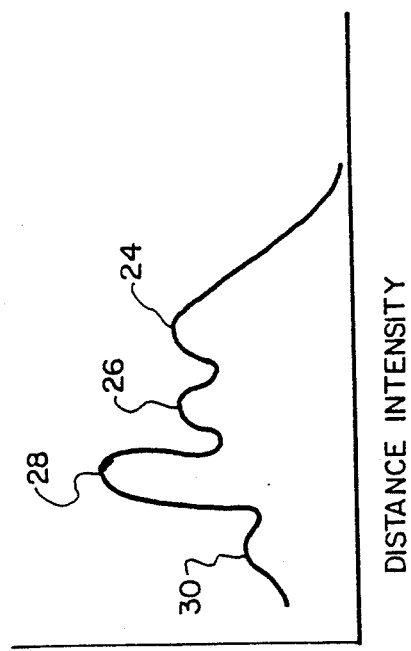
FIG.3.B.
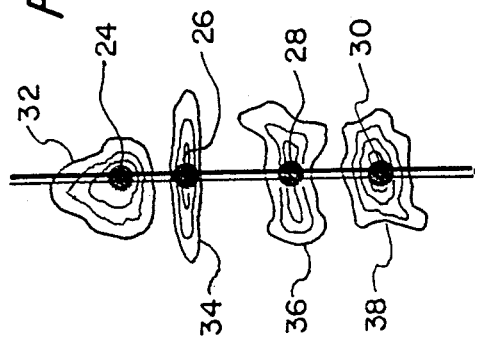
FIG.3.A.

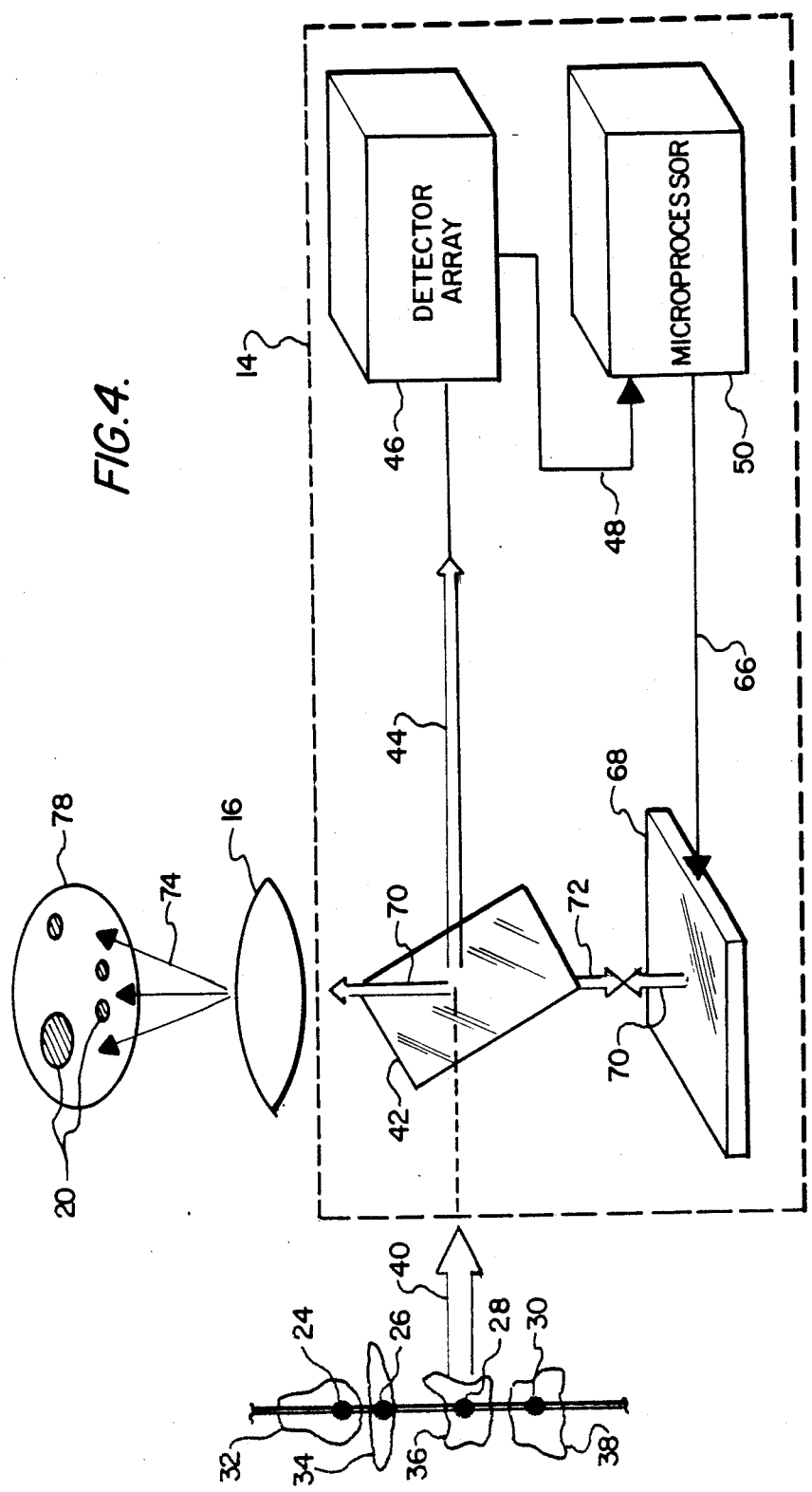

OPTICAL THRESHOLDING APPARATUS AND METHOD

This application is a continuation of Ser. No. 145,334, filed 1/19/88, now abandoned.

BACKGROUND OF THE INVENTION

1. Field of the Invention

This invention relates to the characterization and processing of optical beams, and more particularly to a system and method for detecting and adaptively thresholding a two dimensional image or data pattern via a quasi-one-dimensional planar, positionally mapped intensity spectrum of a light beam for re-transformation to a two-dimensional thresholded output.

2. Description of the Related Art

Optical computing and logic processing may be performed by using the optical intensities distributed across a light beam. This may be accomplished by first converting the distribution of optical intensities to a positional mapping, and then operating upon the signal at each different position to perform the desired computing or processing. The meaning of "light" or "optical" as used throughout this specification is not limited to wavelengths of the visible range, but should be understood to encompass the entire electromagnetic spectrum of wavelengths including, for example, infrared.

A system which accomplishes the desired intensity-to-position mapping is described in U.S. Pat. No. 4,351,589 to pierre H. Chavel et al., assigned to Hughes Aircraft Company, the assignee of the present invention. The patent discloses the use of liquid crystals to produce variable gratings, which diffract incoming light by varying amounts depending upon the grating period. The optical intensities at the different locations in an input light beam control the grating period at corresponding locations in the liquid crystal media. The variable gratings convert the spatial intensity distribution of the input beam to a positional mapping of intensities, from which the desired computing and logic functions can be accomplished.

Other systems to accomplish the intensity-to-position mapping are disclosed in U.S. patent application Ser. No. 879,719, "Optical Intensity-To-Position Mapping Apparatus and Method" by Bernard Soffer and U.S. patent application Ser. No. 900,053, "Light Deflector Apparatus and Method" by Yuri Owechko, both applications being assigned to Hughes Aircraft Company, the assignee of the present invention. Messrs. Soffer and Owechko are also the inventors of the present invention. Their prior systems disclose methods of using diffraction principles different from the variable grating-based system disclosed in the Chavel et al. patent. By varying the refractive indices of an array of small, variable refraction modules provided to receive an input light beam with optical intensities that vary as a function of position with the beam, the input optical intensities are mapped onto an array of optical output directions from the modules.

With any of the above-referenced systems, the mapping process yields a number of discrete spots, the intensity of each spot corresponds to the number of pixels in the input light beam which have an optical intensity corresponding to the position of said spot. This representation is called a histogram.

Once a histogram has been obtained, it may be used as a thresholding mechanism for blocking portions of the original beam which fail to exceed a given threshold, such as a predetermined multiple of standard deviations or variances of the original optical beam intensity distribution. The predetermined multiple can also be time-varying, and is selected to provide the intensity threshold desired. Histogram processing on serial electronic computers is relatively slow because all of the pixels in the input image must be processed for each histogram bin.

Another optical processing method created by Hughes Aircraft Company, the assignee of the present invention, utilizes a phase-conjugate resonator configuration. The phase conjugate resonator provides for the non-mixing of transverse modes, thereby allowing spatially disparate regions to reach the threshold of oscillation independently. This method uses a fixed, rather than variable, threshold and is still subject to noise.

SUMMARY OF THE INVENTION

In view of the above problems, the primary purpose of the present invention is to provide an apparatus and method for detecting and adaptively thresholding a positionally-mapped, one-dimensional intensity spectrum of a light beam for re-transformation to a two-dimensional thresholded output, with a faster response time than previously available.

Another goal of the present invention is to provide distribution and standard deviation information concerning the original optical beam, and thus allow accurate thresholding at a predetermined desired intensity level. A time-variable threshold which permits uniform thresholding of the input light beam is also desired.

A further goal is the provision of such a method and apparatus which are capable of selectively passing desired signals in the presence of background noise.

In accordance with the invention, the positionally mapped histogram beam is operated upon to yield a thresholded histogram beam. The thresholded beam excludes those portions of the original histogram beam which are on one side of the position threshold. The thresholded histogram beam is then converted back to the original input beam format, with beam intensities below a level corresponding to the histogram position threshold removed. The position threshold is determined by analyzing the histogram beam to determine the intensity distribution of the original beam, determining certain mathematical parameters of that original beam such as the mean and variance of the intensity level, calculating a desired intensity threshold level from said parameters, and converting the intensity threshold to an equivalent positional threshold for the histogram beam.

A preferred embodiment employs an optical beam splitter to split a positionally-mapped optical beam between a detector array and an electronically addressed spatial light modulator or light valve such as a charge-coupled device liquid crystal light valve (CCD LCLV). The detector array detects the one-dimensional histogram and converts the optical input into equivalent electronic signals. These signals are fed to a microprocessor which determines the original optical beam intensity distribution and calculates the mean and variance (square of the standard deviation) therefrom. Using this information, the computer sets the intensity threshold level at a predetermined multiple of the variance, transforms this level into a threshold histogram positional level, and forwards this information to the CCD LCLV. The threshold is applied to the optical histogram by controlling the CCD LCLV to reflect only those histogram beam positions which exceed the threshold. With the present invention the desired threshold intensity can be time varying as well as fixed. Furthermore, a threshold intensity may be selected which blocks background noise.

These and other features and advantages of the invention will be apparent to those skilled in the art from the following detailed description of a preferred embodiment, taken together with the accompanying drawings, in which:

DESCRIPTION OF THE DRAWINGS

FIG. 2 is a perspective view of a prior intensity-to-position mapping system illustrating the generation of a histogram for use by the present invention;

FIGS. 3A and 3B are respectively an illustration of a quasi-one-dimensional histogram (distribution function) of optical intensities, including spatial Fourier transform components, and a graph illustrating the same;

FIG. 4 is a block diagram of a preferred embodiment of the invention;

DETAILED DESCRIPTION OF A PREFERRED EMBODIMENT

Figure 1:
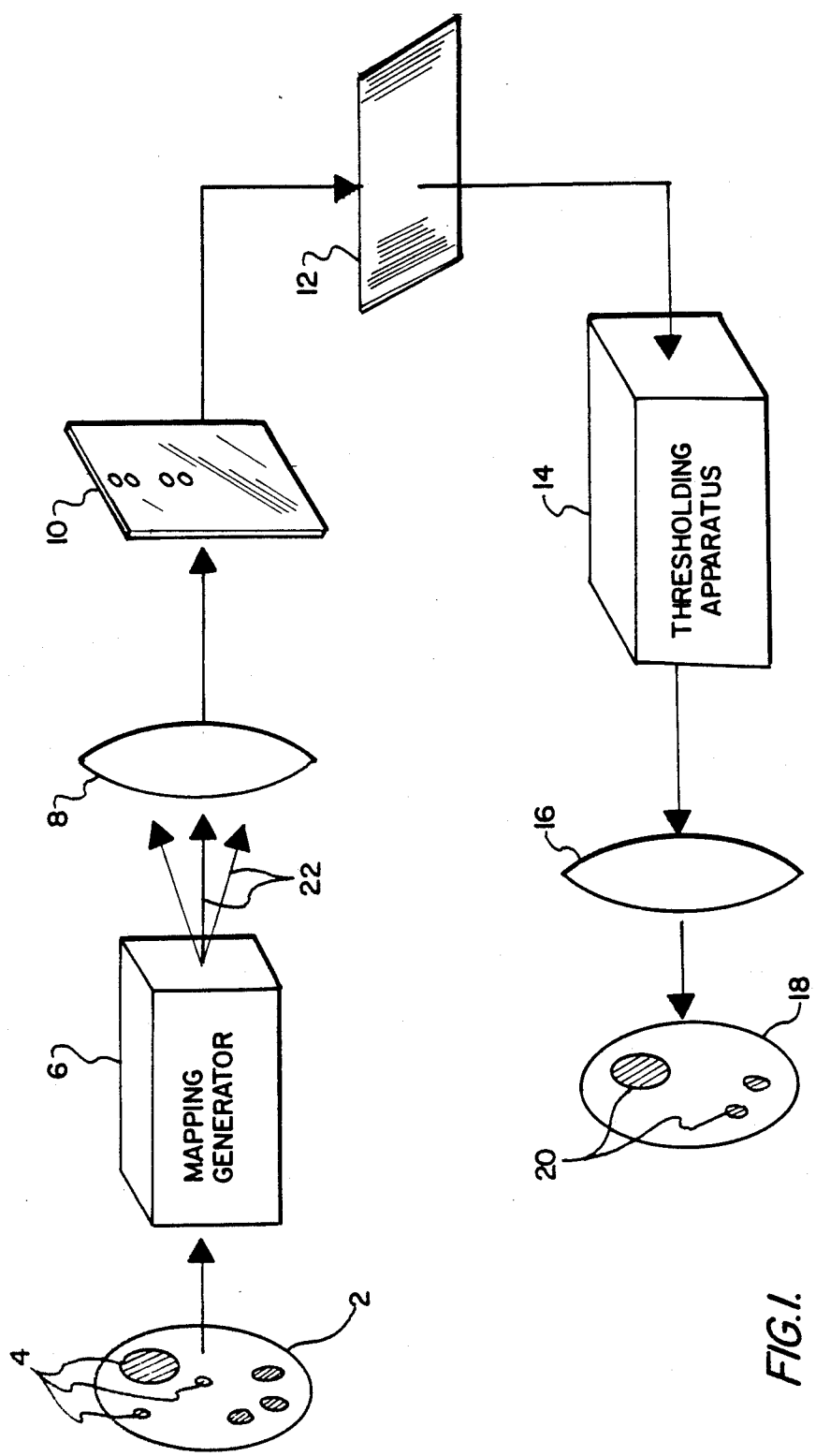
FIG. 1 is a block diagram illustrating one application for the present invention.

The present invention makes use of optical diffraction principles and a computer processor to produce an optical histogram beam with a thresholded positional distribution within the beam, which is ready to be re-transformed back into a two-dimensional optical output with an equivalent intensity threshold. FIG. 1 illustrates how the present invention functions to provide an adaptively thresholded output in which background noise and other undesirable optical intensities are removed. An original input optical beam 2 is shown with a two-dimensional cross-section characterized by a spatial distribution of optical frequencies and intensities; areas of different intensity are identified by reference numeral 4. The beam is inputted to a mapping generator 6, which converts the intensity distribution to an equivalent directional distribution.

The operation of mapping generator 6 is illustrated in FIG. 2. The mapping generator converts original optical beam 2 into a set of beams 22 which are directed onto a Fourier transform lens 8. Mapping generator 6 can employ any of the methods discussed previously, such as electro-optic prismatic deflection or variable grating deflection, for converting an intensity distribution to an equivalent directional distribution. Generally speaking, mapping generator 6 sorts the pixels of optical beam 2 according to their intensity, and into an array of output beams 22 in which each beam 22 corresponds to one of the pixels of input beam 2. The angular directions of output beams 22 vary in accordance with the optical intensities of their corresponding input pixels; higher intensities produce greater angles, lower intensities produce lesser angles, and equal intensities produce parallel beams. Fourier transform lens 8 maps the beams 22 onto the histogram plane 10. The positions of the beams on plane 10 correspond to their angular directions, and thereby to the optical intensities of their corresponding pixels in input beam 2.

It should be noted that position along the histogram plane indicates intensity level in the original optical beam 2, while intensity at any given point on the histogram plane indicates the number of pixels in the original beam 2 with an intensity corresponding to that histogram position. The lens 8 focuses all beams 22 which correspond to like optical intensities in beam 2, regardless of their position in beam 2, onto the same location in histogram plane 10. Therefore, the histogram position distribution corresponds to the original optical beam intensity distribution.

For purposes of illustration, only four separate intensity positions 24, 26, 28 and 30 are shown in FIG. 2. Each of these intensity positions have attendant Fourier spectrum space locations 32, 34, 36 and 38, respectively, mapped with them in a linear array. Accordingly, histogram plane 10 may be considered as a quasi-one-dimensional positional representation of the intensity distribution function for the original input beam 2. For the intensities to map exactly, the histogram plane 10 should be one focal length beyond the Fourier transform lens 8. This optical mapping is done in real time.

Returning now to FIG. 1, the optical beam mapped onto histogram plane 10 is passed through an optional one-dimensional neutral density filter 12. Filter 12 is linearly graded and is used in a conventional manner to restore grey scale. From filter 12 the beam is operated upon by the thresholding apparatus 14 of the present invention, which thresholds and ultimately deflects the beam onto a conventional inverse Fourier transform lens 16. Since the elements of optical histogram 10 contain complex Fourier (side band) information, including phase, which discloses their particular locations in the input beam 2, the simple inverse optical Fourier transform lens 16 produces a filtered, or thresholded, two-dimensional output beam pattern 18 which includes only those optical intensities 20, with their corresponding locations in the beam, which are above a desired threshold intensity.

FIG. 3A depicts the quasi-one-dimensional optical intensity distribution function, or histogram, of FIG. 2. In this drawing the contours of the spatial Fourier transform components can be seen. As shown, position location 24 is furthest from the center of the histogram and therefore represents the strongest original beam 2 intensity, position location 26 is somewhat closer to the center but still represents a relatively strong intensity, position location 28 represents a relatively weak intensity, and position location 30 represents the weakest intensity. FIG. 3B translates the histogram of FIG. 3A into a Fourier transform function graph, with each of the histogram positions graphed as a function of the number of times its corresponding intensity appears in the input optical beam.

FIG. 4 illustrates a preferred embodiment of the thresholding apparatus, shown within dashed box 14. The histogram of FIG. 3A is transmitted as a quasi-one-dimensional light beam 40. Beam 40 is directed onto a beam splitter 42 which splits the input histogram beam 40 into sub-beams 44 and 72 which are directed onto a detector array 46 and a CCD LCLV 68, respectively.

CCD LCLVs have applications mainly in optical data processing as an electronically-addressed optical light modulator for spectrum analysis, image correction, radar, and spread-spectrum signal processing. The general structure and operation of such devices is described in an article by Uzi Efron et al., "Silicon Liquid Crystal Light Valves: Status and Issues", *Optical Engineering*, Vol. 22, No. 6, Nov./Dec. 1983, pages 682–686. Detector array 46 is commercially available from various manufacturers such as RCA and Sony. It is a segmented array composed of numerous pixels. The array detects the quasi-one-dimensional split beam 44, and produces electrical signals 48 representing the spatial and intensity distribution of beam 44 which are proportional in electrical intensity to the optical intensities detected. These electronic signals are in turn fed to a microprocessor 50.

Various commercially available microprocessors may be used to perform the algebraic functions required by the present invention. The preferred device is a chip containing a microprocessor with directed capabilities and user access necessary to adjust the desired threshold information used by the microprocessor in its calculations. The microprocessor 50 could employ a circuit, ROM, or be operated by a software program, to enable it to read the incoming electronic signals 48, calculate the algebraic mean and variance of the intensity distribution of the original beam, and calculate a threshold level based on user-inputted parameters. The desired intensity threshold is typically expressed as a given multiple of the variance of the intensity distribution, but other mathematical parameters could also be used. Microprocessor 50 is programmed to convert the intensity threshold to an equivalent generalized Fourier transform space positional threshold consistent with the histogram format. It produces a position-based threshold voltage signal, and sends this signal along line 66 to the CCD LCLV 68. The signal is a single electrical voltage value, although it may be time-varying in value if the microprocessor is user-inputted with a time-varying threshold intensity level.

Figure 5:
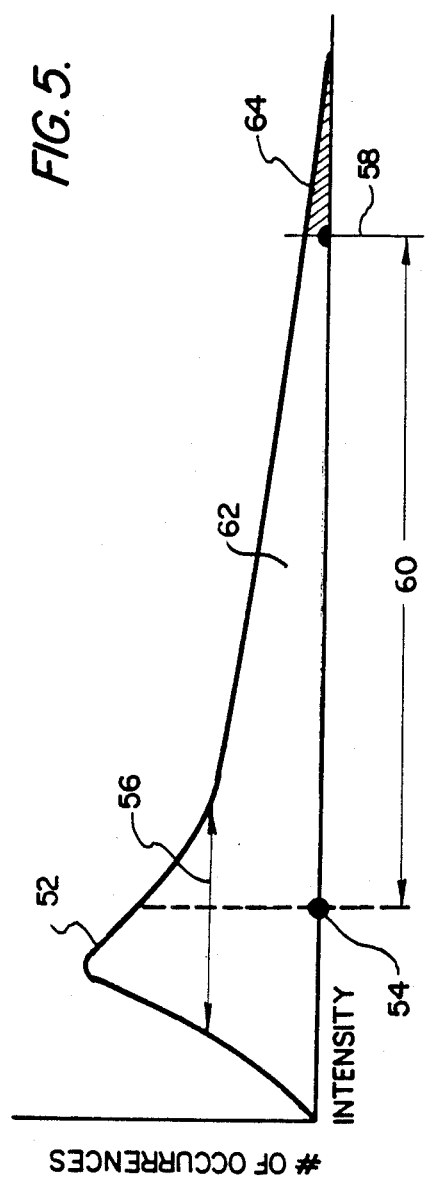
FIG. 5 is a graph providing an example of threshold information which may be determined by the invention.

FIG. 5 depicts a possible intensity distribution function or histogram, with intensity in the original beam 2 shown on the horizontal axis and the vertical axis indicating the number of times any particular intensity appeared in the original beam, regardless of position. Microprocessor 50 calculates the mean intensity value 54 and the variance 56. Microprocessor 50 then establishes the desired intensity threshold level 58, which is a predetermined multiple of variances 60. For the example shown, the desired intensity threshold level 58 occurs at 3 variances above average intensity value 54. The desired intensity threshold level could be any arbitrary multiple of the variance, and could be established either from the average intensity value 54 or from any other intensity value desired. For the desired intensity threshold level 58, it determines those intensities 62 which are below the threshold and will be blocked, while intensities 64 which exceed the threshold are transmitted. From the intensity threshold for the original input beam 2, the microprocessor calculates an equivalent positional threshold for the histogram beam, and it is the latter signal which is delivered over microprocessor output line 66. The blocking/transmission mechanism is explained immediately below.

Figure 6:
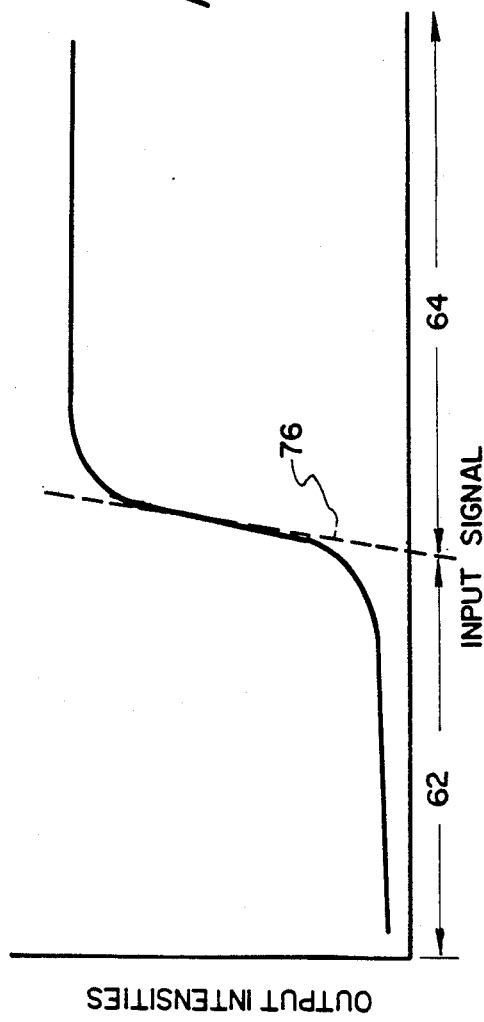
FIG. 6 is a graph depicting an example of the input/output light intensity characteristic of a CCD LCLV which forms part of the invention.

Returning to FIG. 4, the electrical signal on line 66 addresses CCD LCLV 68 to optically reflect only those histogram beam positions which exceed the positional threshold and thus correspond to input beam intensities exceeding the desired threshold intensity level e.g., intensities 64 of FIG. 5. A CCD LCLV's reflectivity is based on an input/output light intensity characteristic such as that shown in FIG. 6. This characteristic shows the threshold 76 implemented by a CCD LCLV. Since a CCD LCLV is a spatial light modulator, its reflectivity is governed by the voltage applied across it. As the voltage varies, the position of the threshold 76 shifts to accommodate the voltage change. Thus, split beam 72 strikes CCD LCLV 68 with the complete histogram from beam splitter 42, but only that portion of the beam which is positioned further from the beam center than the position threshold is reflected as a positionally thresholded beam 70. Reflected thresholded beam 70 passes through beam splitter 42 and continues to the inverse Fourier transform focusing lens 16. Lens 16 re-transforms the positionally-thresholded one-dimensional beam into an intensity-thresholded two-dimensional output 74 which includes only those optical intensities of the input beam 2 which exceed the intensity threshold level. The positions of such intensities in the original beam 2 are restored through the preservation of the spatial Fourier transform components, including phase, in the histogram. Thus, by thresholding the optical intensities in this manner most, if not all, background noise can be eliminated. This provides not only a more accurate and uniform light beam to improve optical computing and logic processing, but also a faster response time.

While a specific embodiment of the invention has been shown and described, it should be understood that numerous variations and alternate embodiments will occur to those skilled in the art. For example, a transmissive LCLV might be used instead of a reflective device, and mechanisms might be devised for both detecting the positional spectrum of the histogram beam and imposing a corresponding threshold upon that beam without having to split it. Accordingly, it is intended that the invention be limited only in terms of the appended claims.

We claim:

1. An optical thresholding apparatus for establishing a threshold optical intensity level for an input optical beam and removing portions of the beam below said level, the optical beam being characterized by a spatial intensity distribution, comprising:

means for transforming the input beam into a histogram beam having a positional distribution which corresponds to the intensity histogram distribution of the input beam, sensing means positioned to sense at least a portion of the histogram beam, said sensing means responding to the histogram beam to establish a desired threshold intensity level for the input beam and a corresponding threshold positional level for the histogram beam, and transforming said threshold levels into a threshold-specified output signal, a light valve positioned to receive at least a portion of the histogram beam and connected to receive said threshold-specified output signal, said light valve being responsive to said signal to output a thresholded histogram beam having a thresholded positional distribution which corresponds to said desired threshold intensity level for the input beam, and means for transforming said thresholded histogram beam into an output beam having substantially the spatial intensity distribution of the input beam subject to said desired threshold intensity level.

2. The optical threshold apparatus of claim 1, said means for transforming the input beam into a histogram beam comprising an intensity-to-angle mapping generator and a Fourier transform lens, and said means for transforming said thresholded histogram beam into an output beam comprising an inverse Fourier transform lens.

3. An optical thresholding apparatus for thresholding a histogram light beam which contains an optical position distribution corresponding to the spatial intensity distribution of an original optical beam, comprising:

means positioned to sense at least a portion of the histogram light beam, to determine therefrom the intensity distribution of the original beam, to calculate a desired intensity threshold level from said intensity distribution, to transform said desired intensity threshold to a corresponding positional threshold in the histogram beam, and to generate a threshold-specified output signal representing said positional threshold; and a light valve positioned to receive at least a portion of said histogram beam and connected to receive said threshold-specified output signal, said light valve being responsive to said signal to output a beam having substantially the positional distribution of the histogram beam subject to said threshold positional level.

4. The optical thresholding apparatus of claim 3, wherein the light valve is governed by the threshold-specified output signal from the sensing means to output only those histogram beam positions which correspond to the original optical beam intensities exceeding said threshold intensity.

5. The optical thresholding apparatus of claim 3, wherein said sensing means comprises the combination of a detector which detects the histogram beam and generates signals representing the positional distribution of said beam, and a signal processing means connected to receive said generated signals and to establish therefrom said positional threshold.

6. The optical thresholding apparatus of claim 5, wherein said signal processing means comprises a computer.

7. The optical threshold apparatus of claim 6, wherein said light valve comprises a charge-coupled device liquid crystal light valve.

8. An optical thresholding apparatus for thresholding a histogram light beam which contains an optical positional distribution corresponding to the intensity distribution of an original optical beam, comprising:

means for splitting the histogram beam into first and second beams which retain the positional distribution of the histogram beam;

means positioned to detect said first beam and to generate signals representing the positional distribution of said first beam;

signal processing means connected to receive said signals from said detection means, to determine therefrom a desired intensity threshold level for the original beam, and to generate a threshold-specified output corresponding to said intensity threshold for the original beam; and electro-optical processing means positioned to receive said second beam and connected to receive said threshold-specified output signal, said processing means being responsive to said signal to produce an output beam which comprises the portions of said second beam on one side of said positional threshold.

9. The optical thresholding apparatus of claim 8, wherein said electro-optical processing means is responsive to said signal to produce an output beam which comprises the portions of said second beam which exceed said threshold positional level.

10. The optical thresholding apparatus of claim 9, wherein the signal processing means determines the desired intensity threshold level from the signals received from said detection means by generating the original optical beam intensity distribution therefrom, calculating the algebraic mean and variance of said intensity distribution, setting the desired threshold intensity level at a predetermined multiple of variances, transforming said desired intensity threshold to a corresponding positional threshold in the histogram beam, and generating a threshold-specified output signal representing said positional threshold.

11. The optical thresholding apparatus of claim 10, wherein said signal processing means comprises a computer.

12. The optical thresholding apparatus of claim 8, wherein said electro-optical processing means comprises a charge-coupled device liquid crystal light valve.

13. An optical thresholding apparatus for thresholding a histogram light beam which contains an optical positional distribution corresponding to the intensity distribution of an original optical beam, comprising:

a beam splitter positioned to split the histogram beam into first and second split beams;

an optical beam detector positioned so as to detect said first beam and to generate signals representative thereof;

a signal processor connected to receive the signals from said detection means, to determine therefrom the original optical beam intensity distribution, to calculate mathematical parameters of said intensity distribution and a desired threshold intensity level from said mathematical desired parameters, to transform said desired intensity threshold to a corresponding positional threshold in the histogram beam, and to generate a threshold-specified output signal representing said positional threshold; and an optical reflector positioned to reflect said second beam and connected to receive said threshold-specified output signal to adjust said reflection in accordance with said positional threshold.

14. The optical thresholding apparatus of claim 13, wherein said optical reflector comprises a charge-coupled device liquid crystal light valve.

15. The optical thresholding apparatus of claim 14, wherein said optical reflector is constrained by said threshold-specified output signal to reflect only those histogram beam positions corresponding to the original optical beam intensities which exceed said threshold positional level, and to block all other histogram beam positions.

16. The optical thresholding apparatus of claim 15, wherein said signal processor comprises a computer.

17. A method for thresholding optical beam intensities so as to block some intensities and pass others within a histogram light beam which contains an optical position distribution corresponding to the intensity distribution of an original optical beam, comprising:

splitting said histogram beam into first and second beams;

directing said first beam to an optical beam detector and said second beam to an optical reflector;

detecting said first beam and generating therefrom a series of electrical signals with electrical intensities directly proportional to the optical position intensities of said first beam to be fed to a signal processor;

processing said series of electrical signals to determine therefrom the original optical beam intensity distribution, calculating a desired intensity threshold level from said intensity distribution, transforming said desired intensity threshold to a corresponding positional threshold in the histogram beam, and generating a threshold-specified output signal representing said positional threshold; and optically reflecting said second beam, and adjusting said optical reflection in response to the electrical signal received from the signal processor to reflect only those histogram beam positions corresponding to the original optical beam intensity distribution which are greater than the threshold positional level, and to block all other histogram positions.

18. The method of claim 17, wherein light reflected from the optical reflector passes through the beam splitter essentially unchanged and continues onto a focusing lens.

19. The method of claim 17, wherein the intensity threshold level is determined during the signal processing step by multiplying a pre-set real number variable with the calculated variance and adding the product to a preset starting position variable.

20. The method of claim 19, wherein said starting position variable is a designated level of the intensity distribution.

21. The method of claim 20, wherein the threshold intensity level and pre-set real number are both time-varying.

* * * * *